United States Patent [19]

Sasho

[11] Patent Number: 5,043,828
[45] Date of Patent: Aug. 27, 1991

[54] EDITING CONTROL SYSTEM FOR RECORDING AND/OR REPRODUCING APPARATUS FOR VIDEO TAPE AND SO FORTH WITH HIGH EFFICIENCY PRE-VIEW OPERATION

[75] Inventor: Hidehiko Sasho, Kanagawa, Japan

[73] Assignee: Sony Corporation, Tokyo, Japan

[21] Appl. No.: 165,770

[22] Filed: Mar. 9, 1988

[30] Foreign Application Priority Data

Mar. 24, 1987 [JP] Japan ................ 62-069996

[51] Int. Cl.[5] .......................................... H04N 5/782
[52] U.S. Cl. .................. 360/14.1; 360/72.3; 360/74.1
[58] Field of Search ............... 360/14.1–14.3, 360/70, 72.1, 72.3, 74.1, 6; 358/311, 335

[56] References Cited

U.S. PATENT DOCUMENTS

| | | | |
|---|---|---|---|
| 3,787,617 | 1/1974 | Fiori | 360/14.1 |
| 3,890,639 | 6/1975 | O'Donnell et al. | 360/14.1 |
| 4,001,882 | 1/1977 | Fiori et al. | |
| 4,355,332 | 10/1982 | Beeson | 360/14.1 |
| 4,365,313 | 12/1982 | Menezes et al. | 360/14.3 X |
| 4,394,694 | 7/1983 | Ninomiya et al. | 360/14.3 |
| 4,428,001 | 1/1984 | Yamamura et al. | 358/335 |
| 4,507,691 | 3/1985 | Ishigura et al. | 360/14.3 |
| 4,517,611 | 5/1985 | Kimura | 360/14.1 X |
| 4,578,718 | 3/1986 | Parker et al. | 360/10.3 |
| 4,587,574 | 5/1986 | Tsurubuchi et al. | 360/14.3 |
| 4,663,679 | 5/1987 | Sekiguchi et al. | 360/14.3 |
| 4,823,198 | 4/1989 | Okumura | 358/311 |

OTHER PUBLICATIONS

Patent Abstracts of Japan, vol. 10, No. 12 (p. 421) [2069], 01/17/86; and JP-A-60 167 183 (Matsushita Denki Sangyo K.K.).
Patent Abstracts of Japan, vol. 10, No. 74 (p. 439) [213], 03/25/86; and JP-A-60 211 674 (Matsushita Denki Sangyo K.K.).

Primary Examiner—Roy N. Envall, Jr.
Assistant Examiner—W. R. Young
Attorney, Agent, or Firm—Philip M. Shaw, Jr.

[57] ABSTRACT

An editing system measures the servo-lock period in every pre-view operation. Pre-roll time is updated based on the measured servo-lock period. The magnitude of rewinding of the tape is thus adjusted on the basis of the updated pre-roll time. By up-dating the pre-roll time in accordance with servo-lock period measured in actual operation, the pre-roll time can be set at a minimum value to be determined according to the servo-lock period. Therefore, the tape does not over shoot the optimum queuing position and the period preceding the cut-in point during pre-view operation can be kept short.

22 Claims, 4 Drawing Sheets

EDITING CONTROL SYSTEM FOR RECORDING AND/OR REPRODUCING APPARATUS FOR VIDEO TAPE AND SO FORTH WITH HIGH EFFICIENCY PRE-VIEW OPERATION

BACKGROUND OF THE INVENTION

1. Field of the Invention

The present invention relates generally to an editing system utilizing an information recording and/or reproducing apparatus, such as a video tape recording and reproducing apparatus. More specifically, the invention relates to an editing control system in the editing system, which can shorten the period of time required to pre-view action during editing.

2. Description of the Background Art

As is well known, the editing involves repeated viewing of a section of the tape loaded in a playback side of a video tape recorder, which will be hereafter referred to as "P-VTR", to confirm and set the editing point to record video information on a master tape. In order to perform this operation, hereinafter referred to as the pre-view operation, the editing system performs a master pre-view operation for reading the video image recorded on the master tape and displaying the video image on a monitor, and a player pre-view operation for reproducing only the video image reproduced by the p-VTR to be recorded on the master tape and producing a black display image during the preceding and following periods.

As a practical matter, in the player pre-view operation, the editing system switches the image on the monitor from the black image to the reproduced image at a cut-in point at which a servo-lock is active. This makes it possible to easily confirm the editing point.

However, the time required for establishing the servo-lock, which will be hereafter referred to as the "servo-lock period", is variable in each video tape recorder (VTR). Therefore, when a VTR which has a long servo-lock period is employed as the p-VTR, if the tape is not rewound to a point which sufficiently precedes the edit point it has the result that the servo lock does not function properly. For this reason, the pre-roll time which represents a number of frames on the video tape loaded on the p-VTR, is set to be longer than the servo-lock period. This assures establishment of the function servo-lock condition before the display image is switched from the black image to the reproduced image.

On the other hand, prolongation of the pre-roll time clearly causes prolongation of the period required to reach the cut-in point. This considerably decreases the efficiency of the editing operation.

In the usual editing operation, the video image output from the p-VTR is recorded on the master tape. Therefore, most editing time is spent in player pre-view operation. In order to set each editing point, the pre-view operation is repeated several times. If the player pre-view time is prolonged, this naturally causes the editing time to be prolonged.

SUMMARY OF THE INVENTION

Therefore, it is an object of the invention to provide an editing system which can shorten the period required for the player preview operation.

Another object of the invention is to provide an editing system which performs the player pre-view operation with minimum pre-roll time.

In order to accomplish the aforementioned and other objects, according to the invention, an editing system measures the servo-lock period in every pre-view operation. The pre-roll time is updated based on the measured servo-lock period. The point to which the tape is rewound is adjusted on the basis of the updated pre-roll time.

By up-dating the pre-roll time based on the servo-lock period measured in actual operation, the pre-roll time can be set at a minimum value determined according to the measured servo-lock period. Therefore, the tape is rewound to the exact point required to provide the requisite servo lock period preceding the cut-in point during the pre-view operation and wasted time is reduced.

According to one aspect of the invention, an editing control apparatus for use with a video tape recording and/or reproducing apparatus, comprises means for rewinding a video tape in the video tape recording and/or reproducing apparatus to pre-roll point which is determined to provide a pre-roll time preceding the editing point, means for reproducing the video tape at least from the pre-roll point to the editing point, means for receiving an indicating a signal representative of a lock condition of a servo circuit contained in the video tape recording and/or reproducing apparatus during reproduction of the video tape, and controlling means for reviewing the pre-roll time in response to the indicating signal and adjusting the pre-roll point to which the video tape is rewound.

The editing control system may further comprise means for monitoring the servo circuit to detect a servo-lock point at which the lock condition is established and wherein the controlling means derives a length from the detected tape position to the editing point for adjusting the preroll point based thereon. In order to avoid wasting time, the controlling means compares the length with first and second reference lengths which define a predetermined range of length and adjusts the preroll point so as to maintain the length within the predetermined range.

According to another aspect of the invention, a control system for an editing system includes a recording and/or reproducing apparatus for recording and/or reproducing information on an information storage medium, the editing system being operable in a pre-view mode for repeatedly driving the medium in the reverse direction and subsequently in the forward direction, the recording and/or reproducing apparatus reproducing information recorded on the medium during forward direction drive of the medium, the control system comprising first means for controlling the recording and/or reproducing apparatus to drive in a reverse direction and to stop reverse direction drive at predetermined position, a second means for reproducing information recorded on the medium which the recording and/or reproducing apparatus drive the medium in forward direction, a third means for detecting the lock condition of a servo circuit in the recording and/or reproducing apparatus to produce a servo-lock condition indicative signal, a fourth means, responsive to the servo-lock condition indicative signal, for measuring an elapsed time to reach a predetermined edit point on the medium, and a fifth means cooperative with the first means, for setting the predetermined position on the basis of the elapsed time so that the elapsed time is maintained within a predetermined range.

The fifth means is responsive to the elapsed time being shorter than a predetermined minimum value of the predetermined range, to instantly terminate operation of the second means. In such a case, the fifth means adjusts the predetermined position by a given magnitude so as to prolong the elapsed time.

The fifth means is also responsive to the elapsed time exceeding a predetermined maximum value of the predetermined range, and adjusts the predetermined position by shortening the elapsed time.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
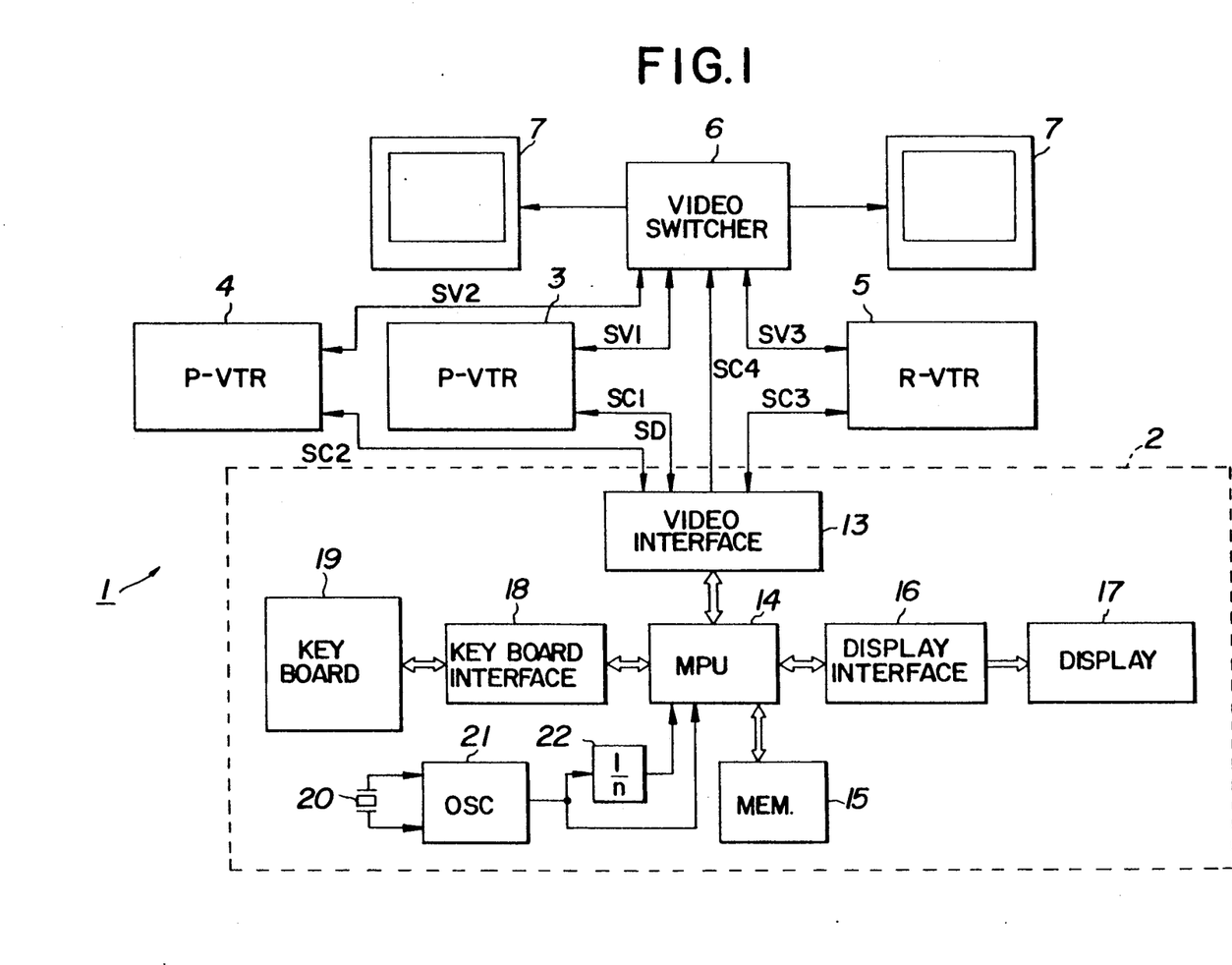
FIG. 1 is a block diagram of the preferred embodiment of an editing system according to the present invention.

Referring now to the drawings, particularly to FIG. 1, the preferred embodiment of an editing system 1, according to the present invention, includes an editing device 2. The editing device 2 is connected to P-VTRs 3 and 4 and a recording side video tape recorder (R-VTR) 5 via a video interface 13. The P-VTRs 3 and 4 and the R-VTR 5 are also connected to a video switcher 6. The editing device 2 outputs control signals $SC_1$, $SC_2$ and $SC_3$ for controlling operations of the VTRs. The editing device 2 also outputs a control signal $SC_4$ to the video switcher 6.

The P-VTRs 3 and 4 produce video signals by reproducing information recorded on video tapes loaded therein, when triggered by the control signals $SC_1$ and $SC_2$. The video tapes to be loaded which contains the video information to be edited for preparing a master tape, will be hereafter referred to as "base tape". On the other hand, the R-VTR 5 is triggered by the control signal $SC_3$ to record the video signal. The P-VTRs 3 and 4 and the R-VTR 5 operating in playback mode produce operation status signals and CTL signals. The operation status signals and CTL signals are fed to the editing device via the video interface 13.

The P-VTRs 3 and 4 are controlled by the control signals $SC_1$ and $SC_2$ to reproduce video signals $SV_1$ and $SV_2$. The reproduced video signals $SV_1$ and $SV_2$ are selectively fed to video monitors 7 and the R-VTR 5 via the video switcher 6 which is controlled by the control signal $SC_4$. The R-VTR 5 is controlled during the recording operation by the control signal $SC_3$.

The editing device 2 comprises a microprocessor unit (MPU) 14 and a memory 15 which includes a ROM section and a RAM section. The ROM section stores edit control programs including the preferred pre-roll control routine. On the other hand, a RAM section is designed for storing various parameters necessary for implementing the edit control programs. A display 17 is connected to MPU 14 via a display interface 16. Also, a keyboard 19 is connected to MPU 14 via a keyboard interface 18. The MPU 14 is further connected to a clock generator 21 including a crystal oscillator 20 to receive clock pulses therefrom. A frequency divider 22 is also connected to the clock generator 21 for dividing the frequency of the clock pulse to input a lower frequency pulse to MPU 14.

During the editing operation the editing device 2 constructed as set forth above outputs the control signals $SC_1$, $SC_2$, $SC_3$ and $SC_4$ at respectively controlled timings. As will be appreciated the pre-view operation for checking the editing point of the video information recorded in the base tape loaded on one of the P-VTRs 3 and 4 is performed repeatedly during the editing operation. The video signal following the edit point reproduced from the base tape in one of the P-VTRs 3 and 4 is provided to the R-VTR 5 to be recorded onto the master tape.

During the master pre-view mode operation, the editing device 2 outputs the control signals $SC_1$, $SC_2$, $SC_3$ and $SC_4$ for synchronization of the P-VTR 3 and the R-VTR 5. The P-VTR 3 and the R-VTR 5 are then operated in playback mode to reproduce the video signals recorded on the base tape and the master tape. The reproduced video signals $SV_1$ and $SV_3$ are selectively output to the monitor 7 via the switcher 6. The switcher 6 controls selection of the video signals $SV_1$ and $SV_3$ to feed to the monitor 7 by the control signal $SC_4$.

In the typical master pre-view operation, the editing device 2 feeds the control signal $SC_4$ to the switcher 6 to reproduce video signals reproduced by the R-VTR 5 on the monitor 7. The editing device 2 also switches the switcher 6 to reproduce the video signal from the P-VTR 3 to be recorded on the master tape in the R-VTR 5. Therefore, the video images recorded on the master tape and the base tape are sequentially reproduced.

On the other hand, during the player pre-view operation, the editing device 2 outputs the control signal $SC_4$ to the switcher 6 to feed a blank video signal to produce a black video image on the monitor 7. After this, the editing device 2 outputs the control signal $SC_1$ to operate the P-VTR 3 in the rewinding mode to rewind the base tape to a point which is a predetermined length from a cut-in point.

The rewinding length L of base tape is determined according to a preroll time which represents the number of frames which are to precede the cut-in point and is stored in the memory 15. As seen from FIG. 2, the tape position TP, in prerolling, is shifted from the cut-in point $C_{IN}$ to a preroll point $P_{PRE}$ which is ahead of the cut-in point by the length L.

Figure 2:
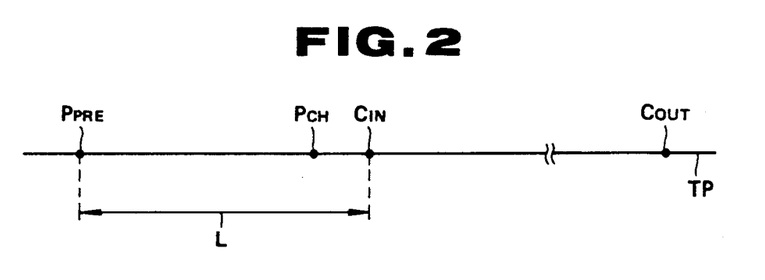
FIG. 2 is an illustration showing the various points on a magnetic tape.

Subsequently, the editing device 2 outputs the control signal $SC_1$ to switch the operation mode of P-VTR to playback mode. The P-VTR 3 response to this control signal $SC_1$ to start reproduction of the video signal on the base tape. According to the playback operation of the P-VTR 3, the tape position TP is advanced toward the cut-in point $C_{IN}$. During the period, in which the P-VTR 3 reproduces the video signal on the frames between the preroll point $P_{PRE}$ and the 0 cut-in point $C_{IN}$, the editing control device 2 continuously monitors the tape position TP. The editing device 2 thus detects the tape position TP at a check point $P_{CH}$. The check point $P_{CH}$ is set relative to the cut-in point $C_{IN}$ and is between the cut-in point and the preroll point $P_{PRE}$, in the vicinity of the cut-in point.

When the tape position TP is detected to be at the check point $P_{CH}$, the editing device 2 checks the state CH of the P-VTR 3 to determine whether it is in the servo-locking state. Then, the editing device 2 outputs the control signal $SC_4$ to the video switcher 6 to switch the signal fed to the monitor from the blank signal to the video signal reproduced by the P-VTR 3, at the cut-in point $C_{IN}$. In this way, the video image reproduced from the video signal of the base tape in the P-VTR 3 is reproduced on the monitor 7.

While the P-VTR 3 reproduces the video signal at the tape positions TP from the preroll point $P_{PRE}$ to the cut-in point $C_{IN}$, the editing device 2 also receives servo information SD which indicates the state of the servo system of P-VTR 3. When the servo-locking state of the P-VTR 3 is detected, the editing device 2 counts the number of frames reproduced between the tape position at which servo-lock is established and the check point $P_{CH}$. The number of frames reproduced, while in servo-locked condition, by the P-VTR 3 between the servo-lock tape position and the check point $P_{CH}$, will be hereafter referred to as the "servo-locked frame number indicative value $F_X$" through the disclosure. Based on the servo-locked frame number indicative value $F_X$, the editing device 2 derives the preroll time and updates the preroll time indicative data in the memory 15.

Figure 3:
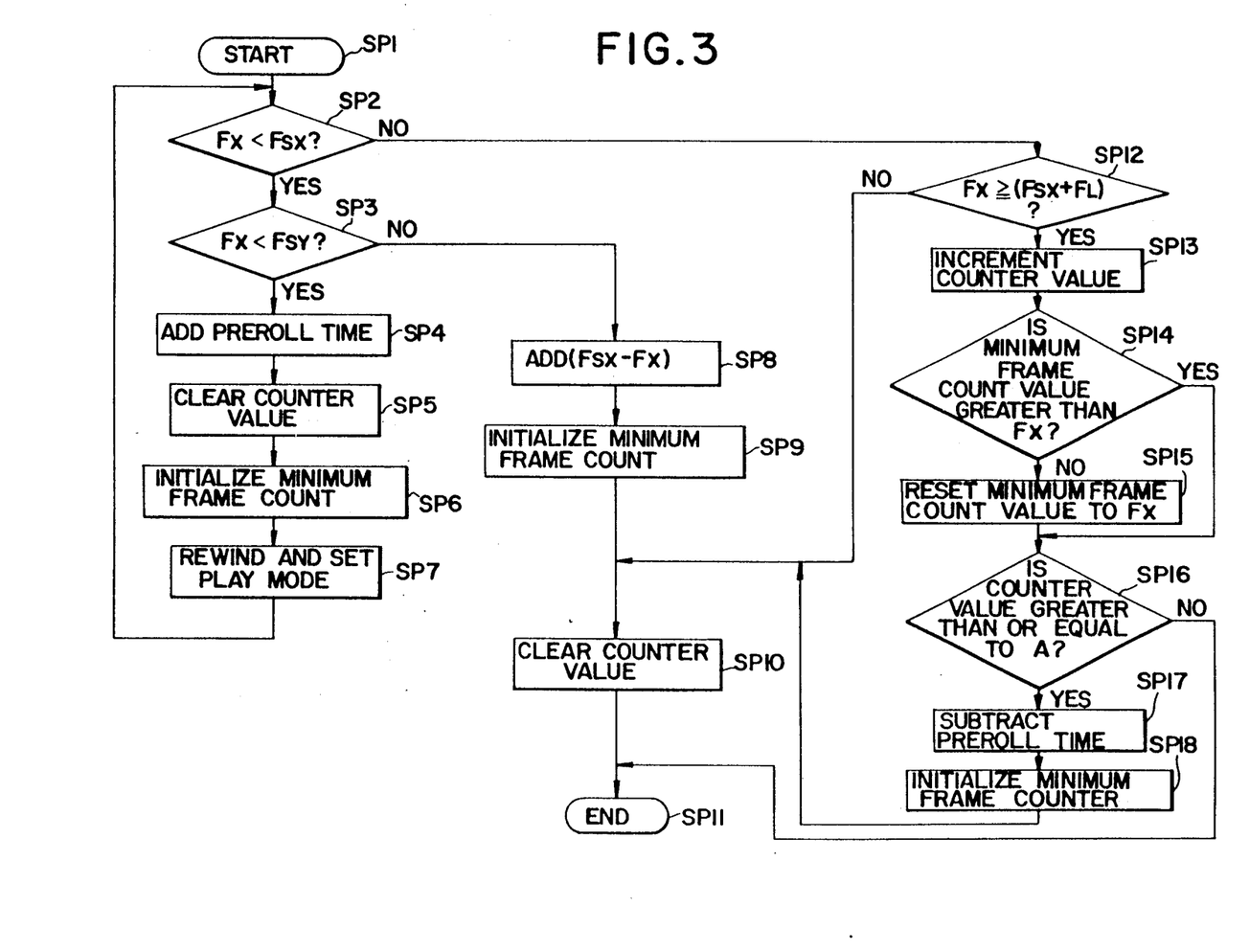
FIG. 3 is a flowchart of a program for deriving the pre-roll time and controlling the tape re-winding operation.

The process of learning the preroll time in the editing device 2 as set forth above will be discussed in more detail with reference to a flowchart of FIG. 3. The editing device 2 triggers the routine of FIG. 3 every time the tape position TP at the cut-in point $C_{IN}$ is detected. The routine starts from step $SP_1$.

Immediately after starting execution, the measured servo-locked frame number indicative value $F_X$ is read at step $SP_2$. In the process of step $SP_2$, the read servo-locked frame number indicative value $F_X$ is compared with a reference value $F_{SX}$ which represents number of frames required for stabilizing servo-lock after establishing the servo-lock and will be hereafter referred to as "$F_{SX}$ reference value". When the servo-locked frame number indicative value $F_X$ as derived at step $SP_2$ is smaller than the $F_{SX}$ reference value, the servo-locked frame number indicative value $F_X$ is compared with a reference value $F_{SY}$ which represents a minimum frame number indicative value required for obtaining acceptable level of servo-lock stability and will be hereafter referred to as the "$F_{SY}$ reference value", at a step $SP_3$.

When the servo-locked frame number indicative value $F_X$ is smaller than the $F_{SY}$ reference value as determined at step $SP_3$, it is deemed that the servo-lock condition at the cut-in point $C_{IN}$ is not acceptably stable. When this judgement is made at step $SP_3$, the editing device 2 outputs the control signals $SC_1$ and $SC_4$ commanding stop of player pre-view operation. Then, at step $SP_4$, a given value corresponding to a predetermined number of frames, e.g. five frames, is added to the preroll time set in the memory 15. At step $SP_5$, a counter which is provided in the editing device 2 for detecting player pre-view cycles having an excessively long preroll time, is cleared. The counter which is provided in the editing device 2 and designed for detecting player pre-view cycles having an excessively long preroll time will be referred to as the "player pre-view cycle counter". A minimum frame counter value which represents the frame at the preroll point $P_{PRE}$ is initialized, at step $SP_6$. Thereafter, player pre-view mode operation is triggered again, at step $SP_7$. In the process of step $SP_7$, the editing device 2 again outputs the control signal $SC_1$ commanding rewinding of the base tape to a point which precedes the cut-in point $C_{IN}$ by the length, which corresponds to the preroll time as updated at step $SP_4$. The editing device 2 detects the tape position at the preroll point $P_{PRE}$ to output the control signal $SC_1$ commanding playback mode operation of the P-VTR 3.

On the other hand, when the servo-locked frame number indicative value $F_X$ as checked at the step $SP_3$ is greater than or equal to the $F_{SY}$ reference value, a judgement is made that the servo-lock stability is of an acceptable level to continue player pre-view operation. Therefore, the player pre-view operation is continued. However, since the servo-lock at this condition is still not completely dependably stable, the preroll time should preferably be expanded. For expanding the preroll time, another given value which represents the difference between the $F_{SX}$ reference value and the servo-locked frame number indicative value $F_X$ is added to the preroll time set in the memory 15, at a step $SP_8$. Then, the minimum frame count value is initialized at a step $SP_9$ and the counter value of the player pre-view cycle counter is cleared at a step $SP_{10}$.

When the servo-looked frame number indicative value $F_x$ is greater than or equal to the $F_{SX}$ reference value as checked at the step $SP_2$, the servo-locked frame number indicative value $F_X$ is again compared with a reference value $F_{SX}'$ which represents an acceptable maximum frame number indicative value, at step $SP_{12}$. The acceptable maximum frame number indicative value $F_{SX}'$ is determined as a sum of the $F_{SX}$ reference value and a possible maximum fluctuation $F_L$ of frames over which the servo-lock timing fluctuates.

It should be noted that the reference value $F_{SX}'$ will be hereafter referred to as "$F_{SX}'$ reference value".

When the servo-locked frame number indicative value $F_X$ is smaller than the $F_{SX}'$ reference value as determined at step $SP_{12}$, the process goes to the step $SP_{10}$. On the other hand, when the servo-locked frame number indicative value $F_X$ as checked at step $S_{12}$ is greater than or equal to the $F_{SX}'$ reference value, the player pre-view counter is advanced by one at step $SP_{13}$. At a step $SP_{14}$, the minimum frame count value is compared with the servo-locked frame number indicative value $F_X'$. When the minimum frame count value is smaller than the servo-locked frame number indicative value $F_X$ determined at step $SP_{14}$, the minimum frame count value is reset to the servo-locked frame number indicative value $F_X$ at step $SP_{15}$. On the other hand, when the minimum frame count value is greater than or equal to the servo-locked frame number indicative value $F_X$ as determined at step $SP_{14}$, the process skips step $SP_{15}$.

At step $SP_{16}$, the player pre-view cycle counter value is compared with a predetermined value A. When the player pre-view counter value is greater than or equal to the predetermined value A, the preroll time set in the memory 15 is decreased by a given value $F_D$ at step $SP_{17}$. In the preferred embodiment, the amount that the preroll time set in the memory 15 is to be reduced by is determined by subtracting the $F_{SX}'$ reference value from the servo-locked frame number indicative value. By the process of step $SP_{17}$, the preroll time in the memory 15 is updated to provide the $F_{SX}'$ for the subsequent player pre-view operation cycle. Thereafter, the minimum frame count value is initialized at step $SP_{18}$, the process then goes to the step $SP_{10}$.

After step $SP_{10}$ or when the player pre-view cycle counter value is smaller than the predetermined value A at step $SP_{16}$, process goes to END, at step $SP_{11}$.

Figure 4:
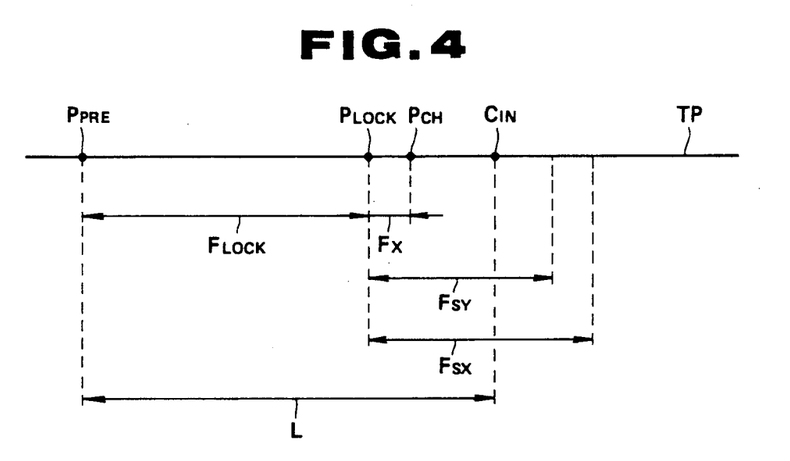
FIGS. 4 to 7 are illustrations showing points on a tape operating in various operating conditions in a pre-view operation.

In summary, in the foregoing player pre-view operation process, the editing device detects whether the number of frames reproduced in the preroll time between the preroll point $P_{PRE}$ and the check point $P_{CH}$ provides a servo-locked frame indicative number $F_X$ which is less or greater than the $F_{SY}$ reference value, as shown in FIG. 4, through the process of step $SP_3$. Since the servo-lock condition of the video signal from the P-VTR after the cut-in point $C_{IN}$ is unstable if said value is less, it is not suitable for use in the editing operation. Therefore, as soon as a judgement is made that the preroll time is too short, the player pre-view operation is terminated and is restarted with an expanded preroll time which is updated through the processes of steps $SP_4$ to $SP_7$. This avoids wasted time which would otherwise be spent for useless player pre-view operations. In addition, since the preroll time expanded through the process of the steps $SP_3$ to $SP_7$ is gradually increased by a given number of frames, excessive expansion of the preroll time, which would result in an overly long period before the cut-in point $C_{IN}$ was reached, never occurs.

Figure 5:
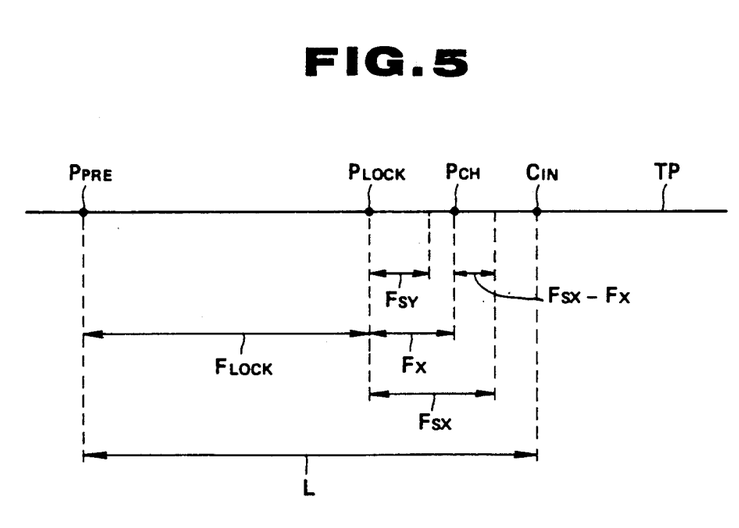

On the other hand, when the preroll time is detected to be within an acceptable range but the servo-locked frame indicative number $F_X$ is still shorter than the period required for obtaining completely stable servo-lock condition at the cut-in point $C_{IN}$ as shown in FIG. 5, the player pre-view operation can be continued since the stability of the servo-lock at the cut-in point $C_{IN}$ is of an acceptable level. However, in order to assure stability of servo-lock in the succeeding cycles of player-review operation, the pre-roll time is expanded and the preroll point $P_{PRE}$ is set at a position, from which the servo-locked frame number indicative value $F_X$ can be obtained. This assures stable establishment of servo lock during the player pre-view operation in spite of minor fluctuations of the tape position TP.

Figure 6:
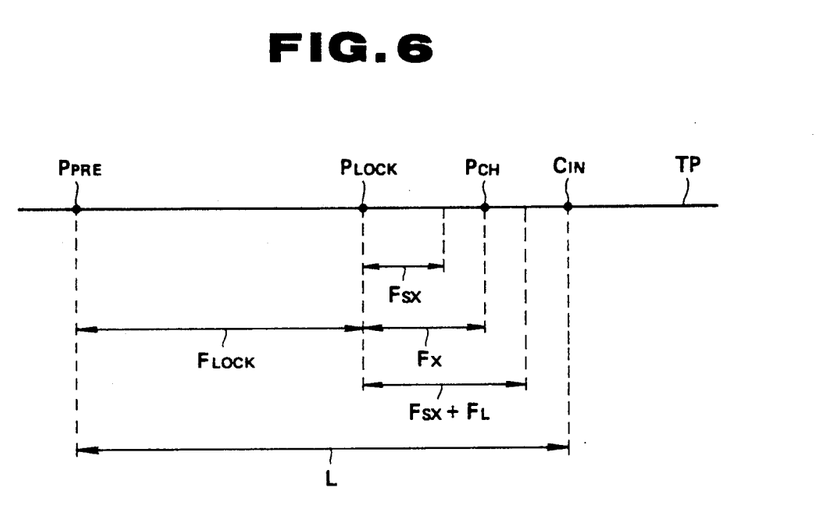
Figure 7:
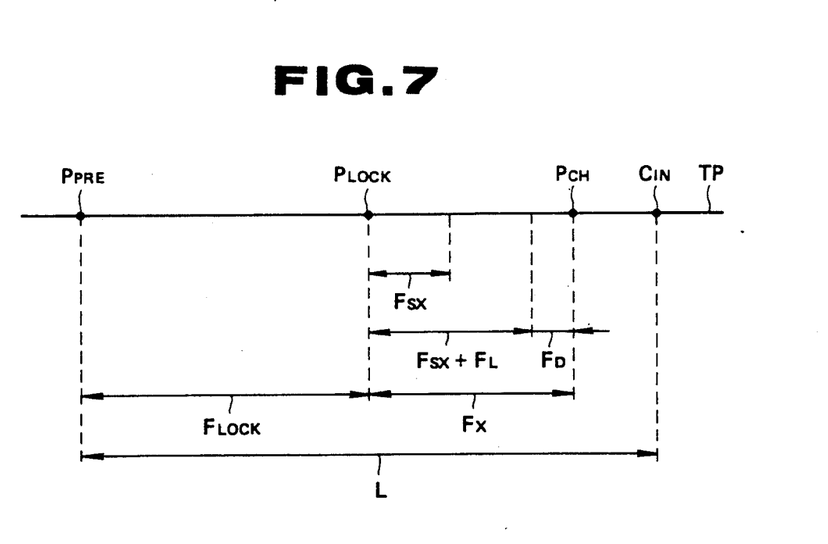

Furthermore, in the preferred process a check is performed to determine whether the preroll time is excessively long or not. Namely, in view of fluctuations of the servo-lock period, an acceptable extra length $F_L$ is provided by the servo-lock timing fluctuation margin in the $F_{SX}'$ value, as shown in FIGS. 6 and 7. If the servo-locked frame number indicative value $F_X$ is in excess of the $F_{SX}'$ value as shown in FIG. 7, it is preferable to shorten the preroll time to minimize time consumption and to maintain the preroll time within a range as illustrated in FIG. 6. On the other hand, it may be preferable to prevent the preroll time adjustment from causing hunting. This can be achieved by confirming that the preroll time is excessively long by waiting several cycles using the preroll time of the current player pre-view cycle. The steps $SP_{16}$ through $SP_{18}$ are provided for this purpose.

As will be appreciated herefrom, the shown embodiment of the editing control system can derive the acceptable minimum preroll time over a plurality of player pre-view operations. The period required for player pre-view becomes minimized and the overall period required for performing editing operations is reduced.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An editing control system for use with a video tape recording and reproducing apparatus comprising:
    means for rewinding a video tape of the video tape recording and reproducing apparatus to a preroll point which is determined to provide a preroll time preceding an editing point;
    means for reproducing the video tape at least from the preroll point to the editing point;
    means for monitoring a servo circuit contained in the video tape recording and reproducing apparatus during reproduction of the video tape to detect a servo-lock point at which a lock condition of the servo circuit is established; and
    controlling means for reviewing the preroll time in response to the servo-lock point, deriving a length from the detected tape position to the editing point and adjusting the preroll point to which the video tape is rewound based thereon.

2. An editing control system as set forth in claim 1, wherein said controlling means compares said length with first and second reference lengths which define a predetermined range of length and adjusts said preroll point so as to maintain said length within said predetermined range.

3. An editing control system as set forth in claim 2, wherein said controlling means terminates the operation of said reproducing means to stop reproduction when said length is shorter than said first reference length.

4. An editing control system as set forth in claim 3, wherein said controlling means adjusts said preroll point to increase said length by a given magnitude when said length is shorter than said first reference length.

5. An editing control system as set forth in claim 2, wherein said controlling means adjusts said preroll point to reduce said length by a given magnitude when said length is longer than said second reference length.

6. An editing control system as set forth in claim 5, wherein said controlling means advances a counter when said length is longer than said second reference length and clears the counter when said length is detected to be within said predetermined range, and adjusts said preroll point to reduce said length when said count reaches a given value.

7. An editing control system as set forth in claim 1, wherein said monitoring means counts the number of frames of a video signal reproduced while said servo circuit is in a locked condition and said controlling means adjusts the preroll point so that the number of frames to be reproduced between said servo-lock point and said editing point, in said locked condition, between said servo-lock point and said editing point, is greater than a predetermined number of frames necessary for consistently reproducing a video signal with the servo circuit in a stably locked condition.

8. An editing control system as set forth in claim 7, wherein said controlling means adjusts said preroll point so that the number of frames to be reproduced, with said servo circuit in a locked condition, between said servo-lock point and said edit point is maintained smaller than a predetermined maximum number of frames which is determined according to the number of frames required for fully stabilizing the servo circuit.

9. An editing control system as set forth in claim 8, wherein said controlling means sets said maximum number of frames at a number greater than said number of frames required for fully stabilizing said servo circuit by a given number of frames which is determined by the maximum possible fluctuation of the servo-lock point.

10. An editing control system as set forth in claim 9, wherein said controlling means includes a counter which advances a counter value when said counted number of frames is greater than said maximum number of frames and adjusts said preroll point to reduce the number of frames to be reproduced between said servo-lock point and editing point to be smaller than or equal to said maximum number of frames when said counter value reaches a predetermined value.

11. An editing control system for use with a video tape recording and reproducing apparatus comprising:
  means for rewinding a video tape of the video tape recording and reproducing apparatus to a preroll point which is determined to provide a preroll time preceding an editing point;
  means for reproducing the video tape at least from the preroll point to the editing point;
  means for receiving an indicating signal representative of a locked condition of a servo circuit contained in the video tape recording and reproducing apparatus during reproduction of the video tape and monitoring the servo circuit to detect a servo-lock point at which the lock condition is established; and
  controlling means for reviewing the preroll time in response to the indicating signal, deriving a length from the detected tape position to the editing point, comparing said length with first and second reference lengths which define a predetermined range of length and adjusting the preroll point to which the video tape is rewound so as to maintain said length within said predetermined range.

12. An editing control system as set forth in claim 11, wherein said controlling means detects said length being shorter than said first reference length to operate said reproducing means to stop reproduction.

13. An editing control system as set forth in claim 12, said controlling means adjusts said preroll point to expand said length by a given magnitude when said length is shorter than said first reference length.

14. An editing control system as set forth in claim 11, wherein said controlling means detects said length being longer than said second reference length to adjust said preroll point so as to reduce said length.

15. An editing control system as set forth in claim 14, wherein said controlling means detects said length being longer than said second reference length is detected to be within said predetermined range, and adjusts said preroll point to reduce said length when said count reaches a given value.

16. An editing control system for use with a video tape recording and reproducing apparatus comprising:
  means for rewinding a video tape of the video tape recording and reproducing apparatus to a preroll point which is determined to provide a preroll time preceding an editing point;
  means for reproducing the video tape at least from the preroll point to the editing point;
  means for receiving an indicating signal representative of a locked condition of a servo circuit contained in the video tape recording and reproducing apparatus during reproduction of the video tape;
  means for monitoring the servo circuit to detect a servo-lock point at which the lock condition is established and counting the number of frames of video signal reproduced while said servo circuit is in a locked condition; and
  controlling means for reviewing the preroll time in response to the indicating signal and deriving a length from the detected tape position to the editing point and adjusting the preroll point to which the video tape is rewound based upon said length so that the number of frames to be reproduced between said servo-lock point and said editing point, in said locked condition, is greater than a predetermined number of frames necessary for consistently reproducing video signal wherein said servo circuit is in a stably locked condition.

17. An editing control system as set forth in claim 16, wherein said controlling means adjusts said preroll point so that the number of frames to be reproduced, with said servo circuit in a locked condition, between said servo-lock point and said edit point is maintained smaller than a predetermined maximum number of frames which is determined according to the number of frames required for fully stabilizing the servo circuit.

18. An editing control system as set forth in claim 17, wherein said controlling means sets said maximum number of frames at a number greater than said number of frames required for fully stabilizing said servo circuit by a given number of frames which is derived in view of the maximum possible fluctuation of the servo-lock point.

19. An editing control system as set forth in claim 18, wherein said controlling means includes a counter which advances a counter value when a counted number of frames is greater than said maximum number of frames and adjusts said preroll point to reduce the number of frames to be reproduced between said servo-lock point and editing point to be smaller than or equal to said maximum number of frames when said counter value reaches a predetermined value.

20. A control system for an editing system including a recording and reproducing apparatus for recording and reproducing information on an information storage medium, said editing system operable in a pre-view mode for repeatedly driving said medium in the reverse direction and subsequently in the forward direction, said recording and reproducing apparatus reproducing information recorded on said medium during the forward direction drive of said medium, said control system comprising:
  control means for controlling the drive of said recording and reproducing apparatus in the reverse direction to stop at a predetermined position;
  playback means for reproducing information recorded on said medium while said recording and reproducing apparatus drives said medium in the forward direction;
  detection means for detecting a lock condition of a servo circuit in said recording and reproducing apparatus to produce a servo-lock condition indicative signal;

measuring means, responsive to said servo-lock condition indicative signal, for measuring an elapsed time required to reach a predetermined edit point on said medium;

a counter the value of which is increased incrementally each time an elapsed time exceeding a predetermined maximum value is detected; and adjustment means cooperative with said control and playback means and responsive to said elapsed time and said counter, which instantly terminates operation of said playback means and adjusts said predetermined position by a given magnitude when said elapsed time is shorter than a minimum predetermined value so as to increase said elapsed time, and which adjusts said predetermined position by a given magnitude in the opposite direction when said counter exceeds a given value so as to reduce said elapsed time, so that said elapsed time is maintained within a predetermined range.

21. A control system for an editing system including a recording and reproducing apparatus for recording and reproducing information on an information storage medium, said editing system operable in a pre-view mode for repeatedly driving said medium in the reverse direction and subsequently in the forward direction, said recording and reproducing apparatus reproducing information recorded on said medium during the forward direction drive of said medium, said control system comprising:

control means for controlling the drive of said recording and reproducing apparatus in the reverse direction to stop at a predetermined position;

playback means for reproducing information recorded on said medium while said recording and reproducing apparatus drives said medium in the forward direction;

detection means for detecting a lock condition of a servo circuit in said recording and reproducing apparatus to produce a servo-lock condition indicative signal;

measuring means, responsive to said servo-lock condition indicative signal, for measuring an elapsed time required to reach a predetermined edit point on said medium; and adjustment means cooperative with said control and playback means, and responsive to said elapsed time, which instantly terminates operation of said playback means and adjusts said predetermined position by a given magnitude so as to increase said elapsed time when said elapsed time is shorter than a predetermined minimum value of said predetermined range, and which adjusts said predetermined position by a given magnitude in the opposite direction so as to decrease said elapsed time when said elapsed time is longer than a predetermined maximum value of said predetermined range, so that said elapsed time is maintained within a predetermined range.

22. A control system as set forth in claim 21, wherein said adjustment means includes a counter the value of which increases incrementally each time an elapsed time exceeding said predetermined maximum value is detected, said adjustment means being responsive to said counter value reaching a given value to adjust said predetermined position and decrease said elapsed time.

* * * * *